United States Patent
Gwozdz

(10) Patent No.: US 9,983,968 B2
(45) Date of Patent: May 29, 2018

(54) SYSTEMS AND METHODS FOR PERFORMANCE MONITORING

(71) Applicant: DocuSign, Inc., San Francisco, CA (US)

(72) Inventor: Kazimierz Krzysztof Gwozdz, San Francisco, CA (US)

(73) Assignee: DocuSign, Inc., San Francisco, CA (US)

( * ) Notice: Subject to any disclaimer, the term of this patent is extended or adjusted under 35 U.S.C. 154(b) by 383 days.

(21) Appl. No.: 14/749,395

(22) Filed: Jun. 24, 2015

(65) Prior Publication Data

US 2016/0378629 A1    Dec. 29, 2016

(51) Int. Cl.
*G06F 11/30* (2006.01)
*G06F 11/34* (2006.01)

(52) U.S. Cl.
CPC ...... *G06F 11/3006* (2013.01); *G06F 11/3409* (2013.01)

(58) Field of Classification Search
CPC ....................................... G06F 11/34–11/3495
See application file for complete search history.

(56) References Cited

U.S. PATENT DOCUMENTS

| 8,744,806 | B2 * | 6/2014 | Bakalov | H04L 41/042 |
| | | | | 702/186 |
| 9,043,184 | B1 * | 5/2015 | Gabay | G05B 23/02 |
| | | | | 702/183 |
| 2013/0159493 | A1 * | 6/2013 | Mitchell | G06F 11/3495 |
| | | | | 709/224 |

* cited by examiner

*Primary Examiner* — Eric Ward
(74) *Attorney, Agent, or Firm* — Schwegman Lundberg & Woessner, P.A.

(57) ABSTRACT

Techniques for obtaining computer system performance monitoring are described. One approach provides a performance monitoring system that is configured to obtain performance-related data from multiple monitored computing systems. The obtained data may be stored by the performance monitoring system in substantially real-time across multiple distinct data stores. The assignment of performance related data items (e.g., counter values) to storage locations may be determined in a various ways, including by random or pseudo-random assignment. Also, data may be stored in a tiered manner, where upper-level tiers aggregate data stored in lower-level tiers.

19 Claims, 13 Drawing Sheets

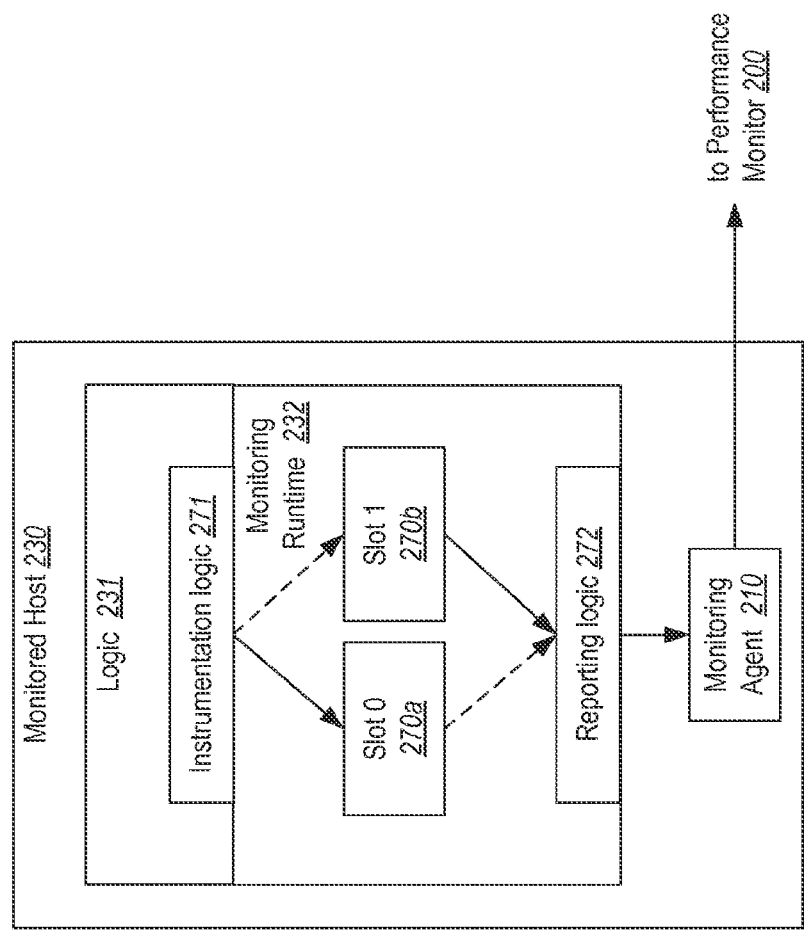

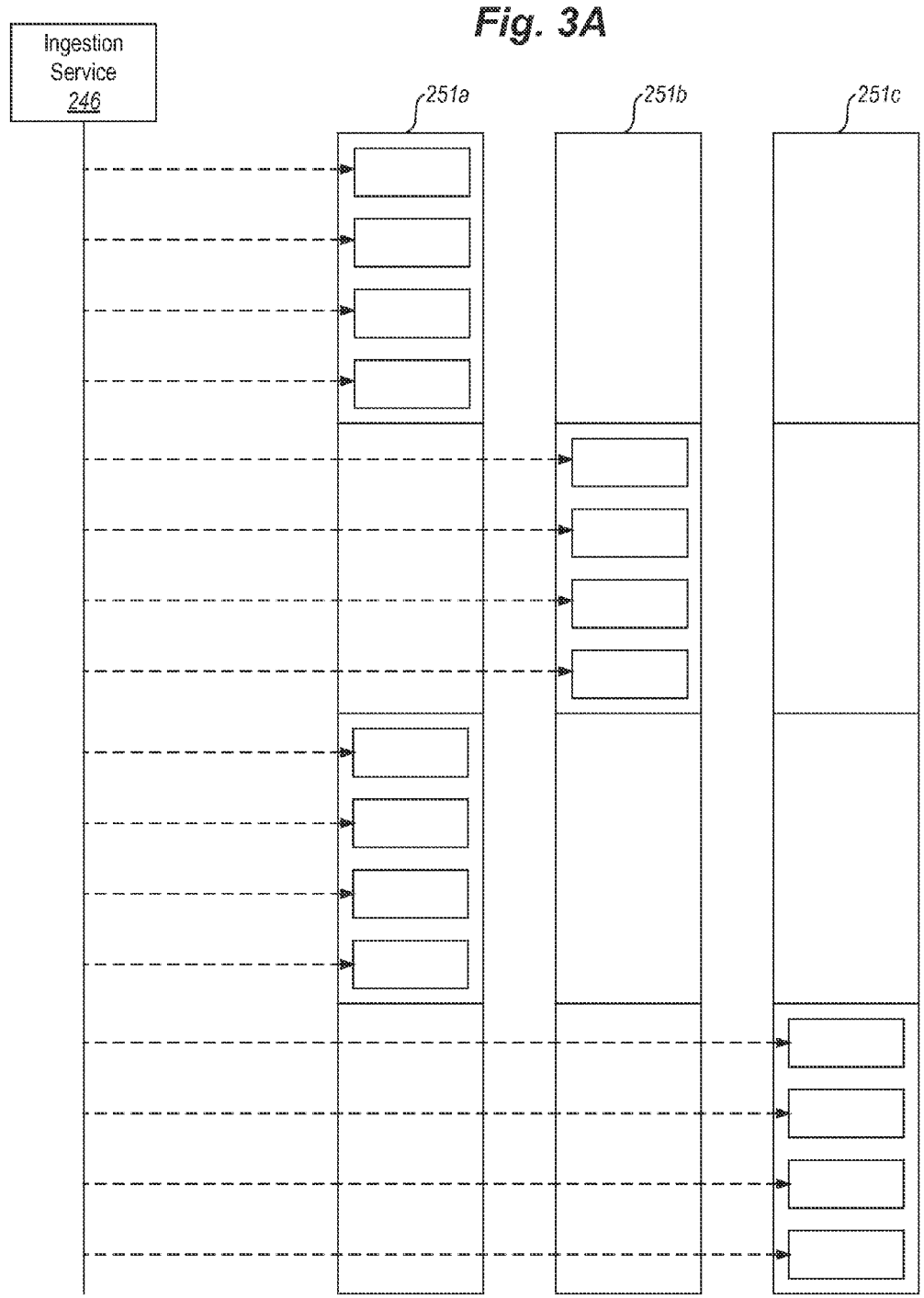

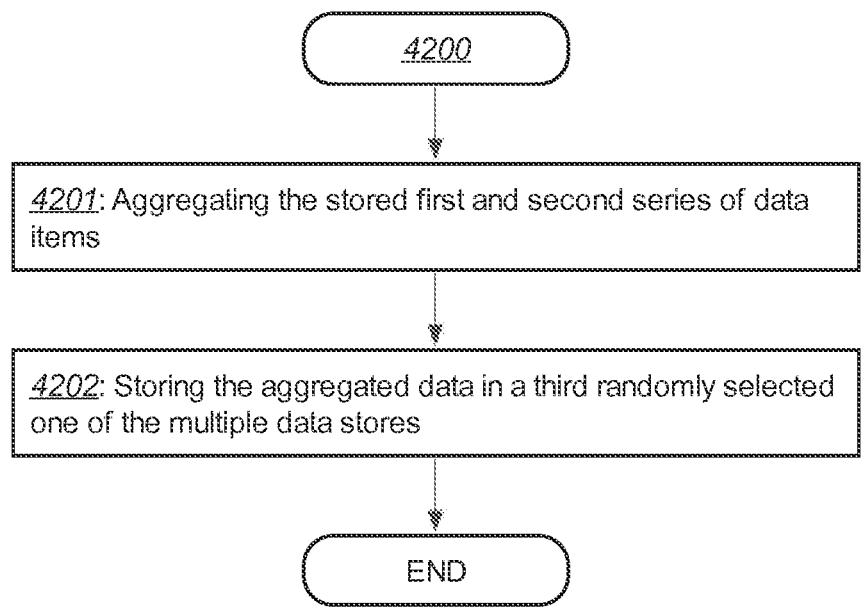

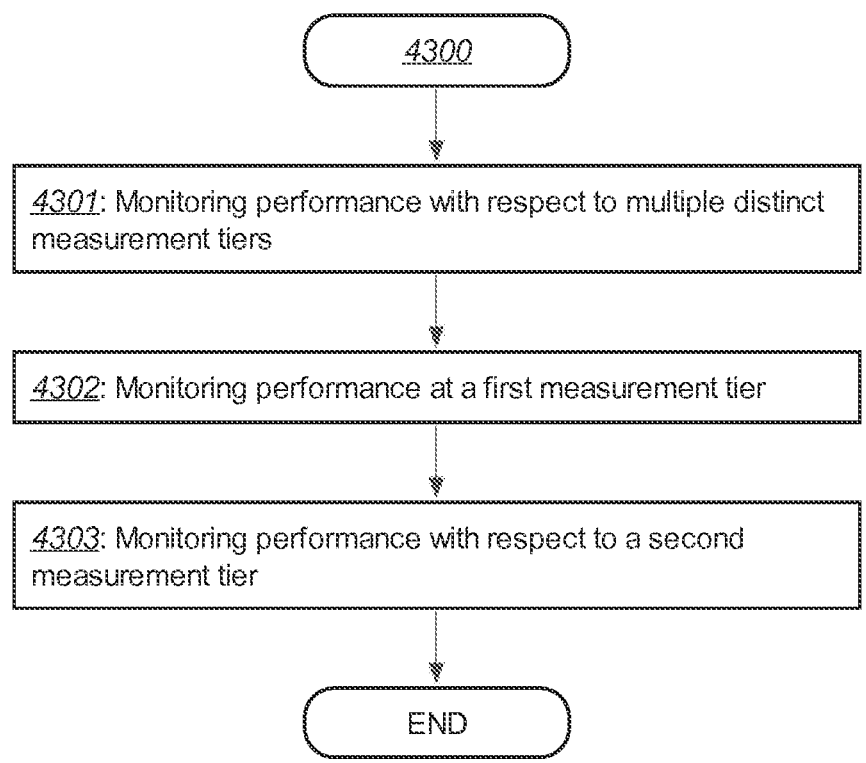

SYSTEMS AND METHODS FOR PERFORMANCE MONITORING

FIELD OF THE INVENTION

The present disclosure relates to systems and methods for computer system performance monitoring and, more particularly, to techniques for robustly and efficiently storing large volumes of performance-related data.

BACKGROUND

Various approaches to monitoring the performance of a computing system or program exist. For example, the run time performance of a program may be monitored by sampling the execution state of the program at regular intervals. At each sampling interval, execution state (e.g., program counter, memory utilization, function call stack) is recorded. In another approach, the run time performance of a program may be monitored by instrumenting the program code. Instrumenting the program code includes manually or automatically (e.g., by a compiler) inserting code that records information about the program state during its execution. A related approach provides for the registration (possibly at runtime) of callbacks that are to be executed in response to the occurrence of particular events (e.g., exceptions, object creation, function calls). Such callbacks can then record information about the execution state of the program.

Monitoring the performance of distributed systems presents special challenges. First, monitoring the performance of even a single system or program can result in the generation of large volumes of performance-related data. This problem is exacerbated when the performance of many computing systems is monitored over a long period of time.

Furthermore, performance monitoring in the distributed systems context gives rise to a need to centralize and/or aggregate stored performance-related data. In one approach, each computing system locally stores its performance-related data, which is then later retrieved and aggregated for analysis. This approach does not allow for substantially real-time analysis of the performance of the monitored systems, individually or as a whole.

In another approach, each computing system transmits performance-related data to a central monitoring system. This solution does not scale well. In particular, the centralized monitoring system becomes a bottleneck for network and storage utilization. Nor is this solution robust. If the disk or other storage device utilized by the central monitoring system fails, performance-related data from all hosts may be lost.

BRIEF DESCRIPTION OF THE DRAWINGS

Preferred and alternative examples of the present invention are described in detail below with reference to the following drawings:

FIGS. 2A-2C are block diagrams of components of a performance monitor and related systems according to an example embodiment;

FIG. 3A illustrates the random distribution of performance-related data items across multiple data stores as performed by some embodiments;

FIGS. 4A-4G are flow diagrams of processes performed by example embodiments.

DETAILED DESCRIPTION

Figure 1:
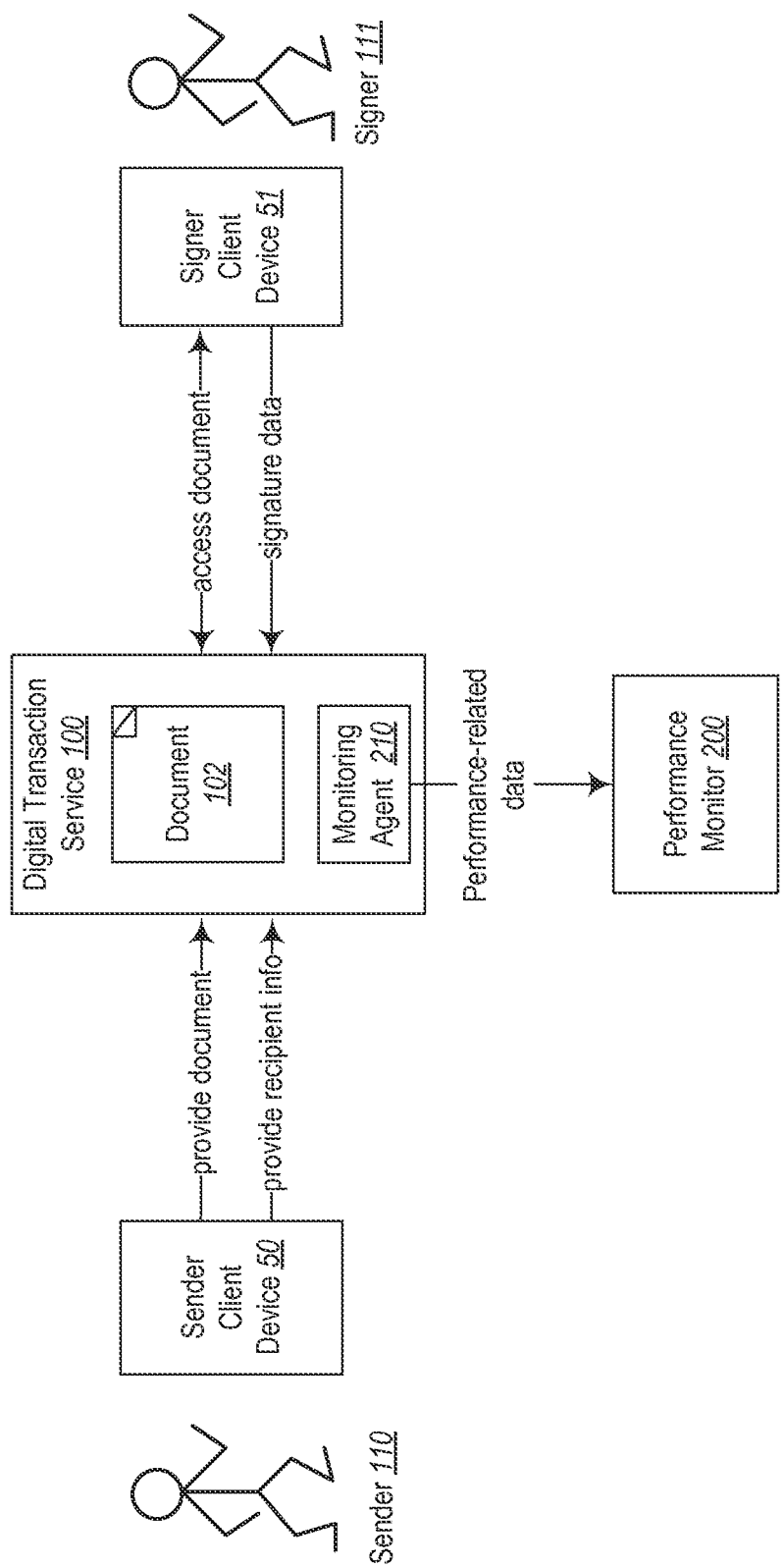
FIG. 1 is a block diagram of a monitored digital transaction service according to an example embodiment.

Embodiments described herein provide enhanced computer- and network-based systems and methods for monitoring the performance of computing systems. Example embodiments provide a performance monitoring system that is configured to obtain performance-related data from multiple monitored computing systems. Performance-related data may include any data that reflects the performance, operation, health, or other conditions related to the operation of the monitored computing systems. Performance-related data may include numeric data, such as counts that reflect various aspects of system performance, such as number of operations performed, time to perform one or more operations, average response time, or the like. Performance-related data may also or instead include textual data, such as log messages, event notifications, exception reports, or the like.

In some embodiments, the obtained data may be stored by the performance monitoring system in substantially real-time across multiple distinct data stores. The assignment of performance related data items (e.g., counter values) to storage locations may be determined in a random or pseudo-random manner. For example, all data items provided by a particular performance counter during a first time interval may be assigned to a first randomly selected data store. Then, all data items provided by the performance counter during a second time interval subsequent to the first time interval may be assigned to a second randomly selected data store. Such an approach serves to distribute data items across multiple data stores.

The assignment of data items to data stores may also be based on one or more factors, including the identity of the computing system, program, or service; identity of the performance counter or other object that is used to collect performance-related data at its source; time; number of data stores; and the like. In one embodiment, data items provided by a performance counter object during a particular time interval are stored on a data store, the identity of which is determined by first calculating a hash that considers the identity of the performance counter, the current time, and the length of the time interval. The identity of the data store (e.g., data store number) is then determined by calculating the hash value modulo the number of data stores.

In some embodiments, the performance monitoring system stores performance-related data in a tiered manner. For example, data items provided by the monitored computing systems may be stored in a first (lowest) tier. Data items that aggregate the data items of the first tier may be stored in a second tier that resides above the first tier. Additional tiers may be employed, each of which stores data that aggregates data items from a lower-level tier. As will be discussed further below, by storing data in a tiered manner, the performance monitoring system is able to limit the total volume of historical data, while still providing a high resolution view of recently occurring events. In particular, the lowest tier typically stores fine-grained data samples obtained from monitored computing systems, while higher-level tiers successively aggregate the data of lower tiers. Thus, the first tier provides a high-resolution view of performance data over a recent period (e.g., an hour, a day, a week), while higher level tiers provide successively lower resolution views of performance data over longer time frames (e.g., weeks, months, years). At the highest tier level, a very long performance history can be stored while staying within reasonable storage limits.

In some embodiments, each tier has a corresponding time interval size. The time intervals are sized so that the time interval for a given tier encompasses multiple time intervals of the tier immediately below the given tier. For example, the first tier may have a time interval size of five minutes while the second tier may have a time interval size of one hour. Each data item stored in the second tier aggregates the data items stored during one time interval of the first tier. Thus, in one time interval of the second tier (one hour), twelve data items will be stored, each aggregating five minutes worth of data items from the first tier.

The tiered storage of data may also be considered when assigning data stores for storage of performance-related data. For example, the assignment function may consider the identity of the tier (e.g., the tier number) in addition to one or more of those factors discussed above, including the identity of the performance counter, the current time, the length of the time interval (e.g., the time interval size for the tier), and the number of data stores. By hashing the result of an arithmetic combination of these factors, the assignment of data items to data stores appears random. Importantly, while the assignment of data items to data stores under such an assignment function appears to be random, it is random in a predictable or recoverable manner. That is, at a future time, given information about the data item, such as the identity of the performance counter, the time at which it was recorded, and the tier number, the data store assignment can be readily computed without reference to an index, mapping, or other metadata that was used to record assignment information.

The described monitoring techniques are robust, scalable, and efficient. Robustness is achieved by utilizing multiple data stores, such that a failure of a single data store will result in loss of only a fraction of the total data. Scalability is obtained by dynamically adding additional data stores in response to increasing storage capacity or bandwidth needs. The described techniques also address storage bottlenecks and hotspots by randomly distributing data across the multiple data stores. In addition, when a tiered approach is used, an aggregated view of data (e.g., how many operations were performed during the last hour) become available with minimal latency, because such data can be readily obtained with reference to the appropriate data storage tier.

The described techniques are applicable in a wide variety of contexts. In the following, the techniques are described above as being deployed with respect to a digital transaction service that provides an electronic signature service configured to manage the collection of electronic signatures with respect to documents such as agreements, contracts, purchase orders, and the like. Using the described techniques in conjunction with a digital transaction service is but one possible deployment scenario, and should not be interpreted as limiting. The described techniques can generally be used in any computing system performance monitoring context. In particular, the described techniques are applicable to monitoring the performance of any system comprising one or more virtual or physical computing systems.

System Overview

FIG. 1 is a block diagram of an example embodiment of a digital transaction service. In particular, FIG. 1 depicts a Digital Transaction Service (DTS) 100 that provides an electronic signature capability. The operation of the DTS 100 is monitored by a performance monitor 200, which is an example or part of a performance monitoring system.

The DTS 100 is utilized by a sender user 110 and a signer user 111 to facilitate an electronic signing of a signature document. In the illustrated scenario, the sender 110 operates a sender client device 50 in order to provide (e.g., upload, transmit) an electronic document 102 (e.g., an invoice, contract, purchase order, agreement) to the DTS 100, where it is securely stored. The DTS 100 then notifies the signer 111 that the document 102 is ready for signature, such as by sending an email containing a link that can be used to access the document 102. The signer 111 operates client device 51 in order to access, review, and sign the document. Once the signer 111 has signed the document 102, the DTS 100 stores an indication of the signature in association with the document 102. The DTS 100 may then notify the sender 110 that the document has been signed, such as by transmitting an email containing a link that can be used to access the document 102.

The DTS 100 is in communication with the performance monitor 200. More particularly, a monitoring agent 210 executes on or within the DTS 100 to obtain and forward performance-related data to the performance monitor 200. The performance monitor 200 stores the performance-related data using the techniques described herein, and provides access to the data and/or aggregations thereof. In the illustrated scenario, the performance-related data may include metrics, such as number of documents stored, operation latency (e.g., object creation time, function call time), operation throughput (e.g., number of documents stored per hour), or the like. The performance-related data may also include text data, such as event notifications (e.g., document has been signed), error messages (e.g., authentication errors, file system errors), or the like.

Figure 2A:
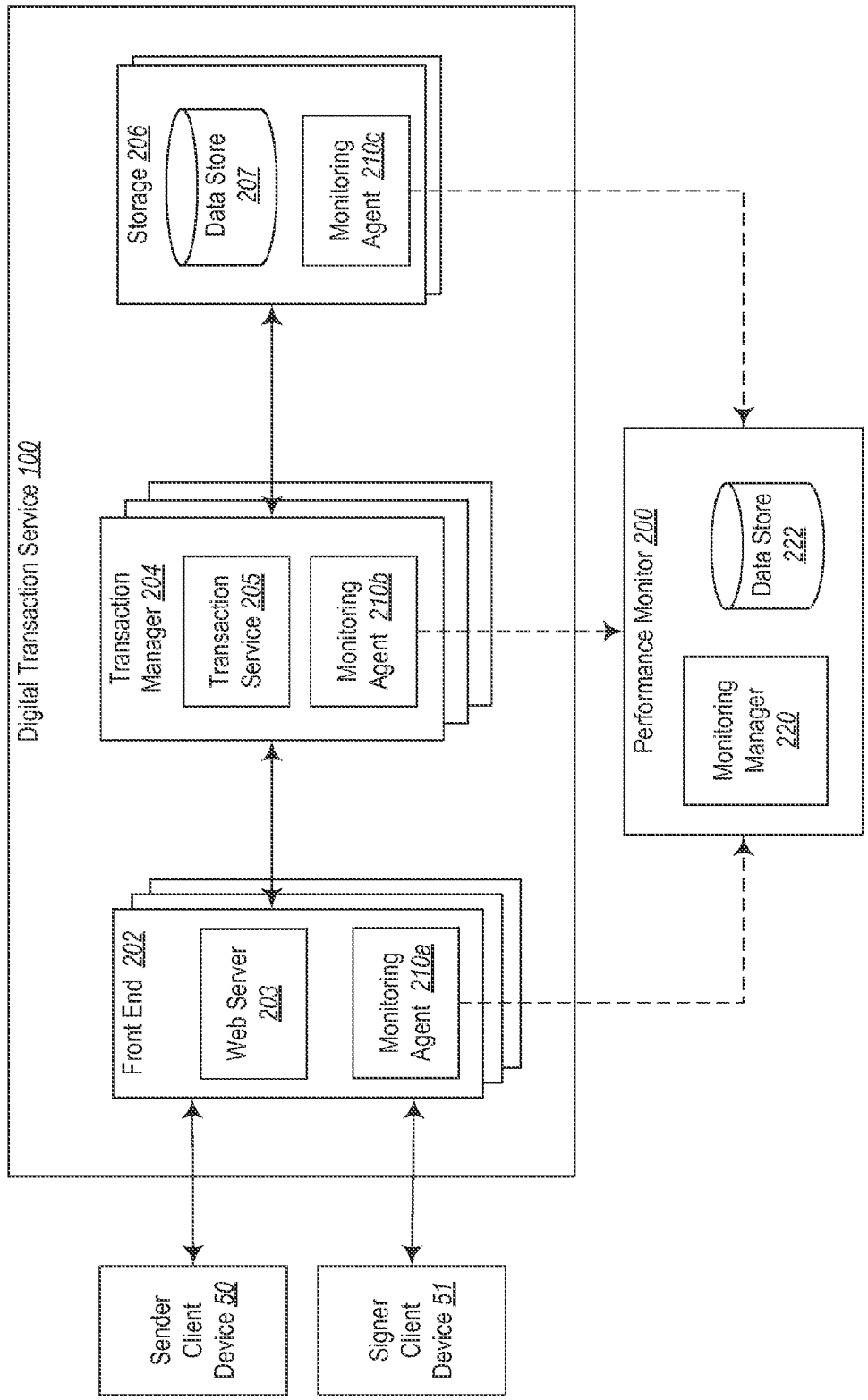
Figure 2B:
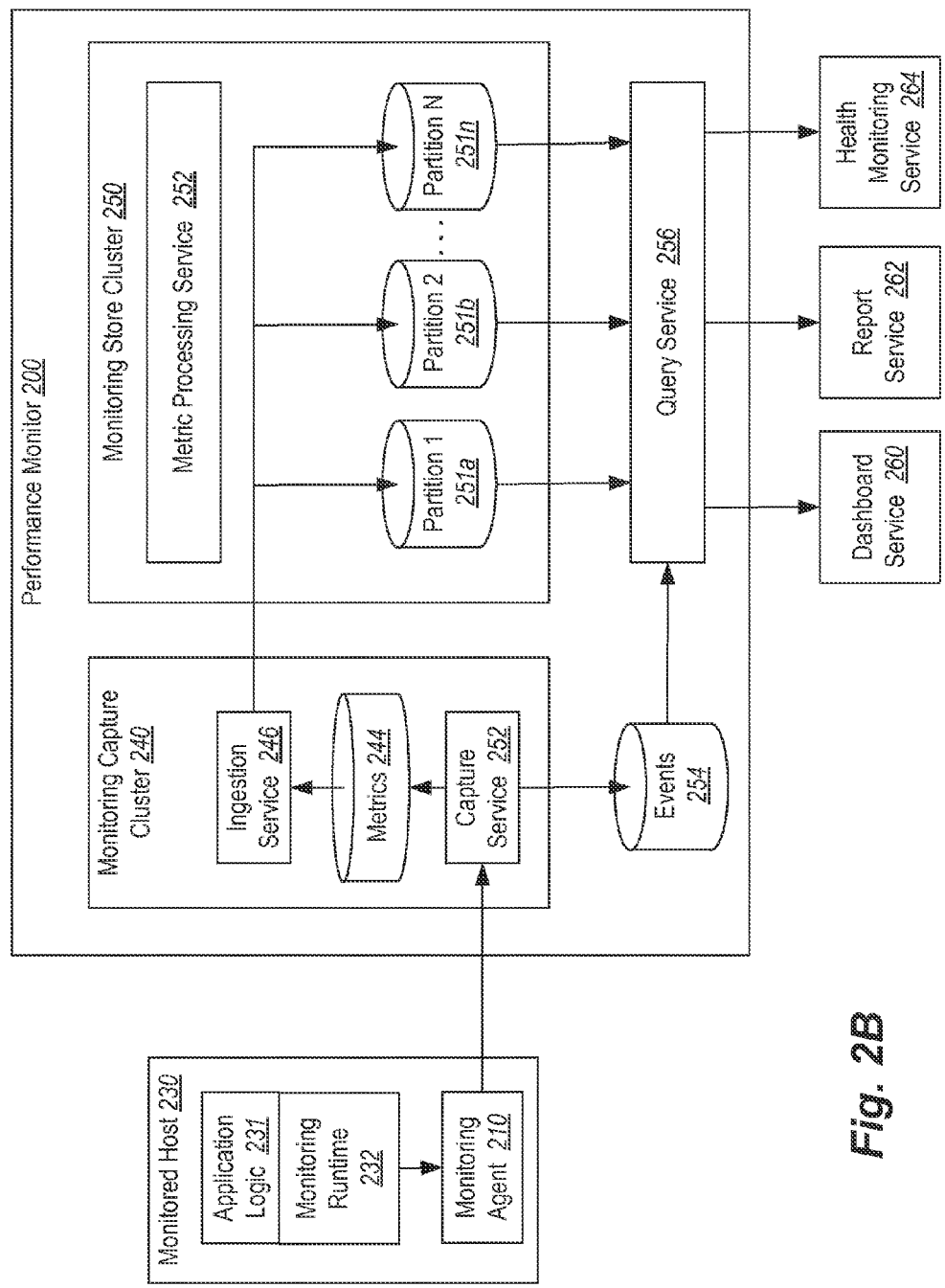

FIGS. 2A-2C are block diagrams of components of a performance monitor according to an example embodiment. FIG. 2A provides additional details about the internal structure of the DTS 100. In particular, the DTS 100 includes multiple distinct computing systems, which each perform one or more functions to cooperatively provide the services of the DTS 100. Each of these computing systems may be virtual or physical computing systems. In other embodiments, the operation of the DTS 100 (or other monitored system) may be decomposed in a different manner.

In the illustrated example, the computing systems of the DTS 100 include front end systems 202, transaction manager systems 204, and storage systems 206. Each of the front end computing systems 202 includes a web server 203 that provides a Web-accessible user interface to the sender client device 50 and signer client device 51. Each of the transaction manager systems 204 includes a transaction service 205. The transaction service 205 is a server or other module that is configured to perform core functions of the DTS 100, including document management, user management, metadata management, transaction tracking, workflow, and the like. Each of the storage systems 206 includes a data store 207 that is configured to store transaction data (e.g., documents, user information, signature data) of the DTS 100.

Each of the computing systems 202, 204, and 206 includes a respective monitoring agent 210a-210c. Each monitoring agent 210 may be an independent process or associated code module (e.g., linked library) that obtains data that reflects the performance of the associated computing system. This data may be obtained in various ways, including by instrumentation, sampling, event callbacks or the like. As data is obtained, it is communicated by the monitoring agent 210 to the performance monitor 200.

The performance monitor 200 includes a monitoring manager 220 and a data store 222. The monitoring manager 220 is responsible for receiving and causing performance-related data to be stored in the data store 222. The monitoring manager 220 may also aggregate data stored in the data store 222, as discussed herein. Also, the monitoring manager 220 may provide services or functions that support the development of user interfaces and remote applications, such as management consoles, health monitoring application, reporting applications and the like.

FIG. 2B provides additional details about the internal structure of a performance monitor 200 and a monitored host 230 according to an example embodiment. The illustrated performance monitor 200 includes a monitoring capture cluster 240, a monitoring store cluster 250, an events data store 254 and a query service 256. In this example, the components of the performance monitor 200 interoperate to collect performance-related data from a the monitored host 230 and provide information about the collected data to external services, including a dashboard service 260, a report service 262 and a health monitoring service 264.

The monitored host 230 is a virtual or physical computing system that executes application logic 231 that is being monitored by the monitor 200. In the context of FIG. 2A, the monitored host may be, for example, one of the transaction manager systems 203, while the application logic 231 may correspond to the transaction service manager 205.

The application logic 231 is associated (e.g., dynamically or statically linked) with a monitoring runtime 232. The monitoring runtime 232 provides facilities for tracking the behavior and operation of the application logic 231. In one embodiment, the monitoring runtime 232 provides and manages counter objects that can be utilized by the application logic 231 to count operations, time, or other metrics that reflect the performance of the application logic 231. These counter objects and other structures of the runtime 232 may be utilized explicitly, such as by function calls, method invocations, or callbacks manually inserted into the application logic 231 at software development time or at runtime. In other embodiments, the counter objects and other structures of the runtime 232 may be utilized implicitly, such as by sampling the execution state of the application logic 231.

The monitoring runtime 232 communicates collected performance-related data to the monitoring agent 210. The monitoring agent 210 may be a separate process that receives performance-related data from one or more distinct applications executing on the host 230. The monitoring agent 210 may from time to time query the monitoring runtime 232 and request a current snapshot of performance-related data. Alternatively, the monitoring runtime 232 may from time to time push its performance-related data to the monitoring agent 210. Having obtained data from the monitoring runtime 232, the monitoring agent communicates the data to the monitoring capture cluster 240, described next.

The monitoring capture cluster 240 includes a capture service 252, a metrics 244 data store 244, and an ingestion service 246. The capture service 252 is configured to receive performance-related data from the monitoring agent 210 executing on the monitored host 230. The capture service 252 determines whether the data is related to performance metrics (e.g., counter values) or events. If the data is metric data, the capture service 252 stores the received data in the metrics data store 244, which serves as a temporary buffer for the data. If instead the data is event data (e.g., log messages, error messages), the capture service 252 stores the received data in the events data store 254. The ingestion service 246 consumes data stored in the data store 244 and forwards it to the monitoring store cluster 250, described next.

The monitoring store cluster 250 includes a metric processing service 252 and multiple partitions 251a-251n (also referred to as partitions 1-N). Each of the partitions 1-N may be a separate and independent database or other data storage facility. The ingestion service 246 of the monitoring capture cluster 240 causes each performance-related data item to be stored in one of the partitions 1-N. As noted above and discussed further below, the stored data items are typically randomly distributed across the multiple partitions 1-N.

The metric processing service 252 manages the operation of the monitoring store cluster 250. In embodiments that implement a tiered data storage scheme, the metric processing service 252 aggregates data across tiers. For example, the metric processing service 252 may aggregate data stored in a first tier (by the ingestion service 246) and store the aggregated data in a second tier. The aggregation function of the metric processing service 252 may be extended to multiple tiers, each one of which aggregates data from the tier below.

The query service 256 provides information about data collected by the performance monitor 200 to client applications/services. Example clients include the dashboard service 260, the report service 262, and the health monitoring service 264. The dashboard service 260 provides an interactive, real-time view of the performance of the monitored host 230 and/or the operation of the performance monitor itself. The report service 262 provides snapshot reports of the performance of the monitored host 230.

The health monitoring service 264 includes logic that can detect patterns, anomalies, and other conditions in the data that is collected by the performance monitor 200 and that reflect the health of the monitored host 230. For example, the health monitoring service 264 may evaluate user-specified rules or other expressions that specify a threshold operational response time (e.g., time to store or encrypt a document). When the operational response time exceeds the specified threshold, the health monitoring service 264 may transmit a notification, alert, or other message.

Other services and clients are contemplated. For example, typical embodiments also include an operator's console that is configured to manage the operation of the performance monitor 200 itself. Also, some embodiments may provide mobile clients.

FIG. 2C illustrates data flow through the monitoring runtime in an example embodiment. In particular, FIG. 2C illustrates a technique for precision real-time data sampling used in some embodiments. This technique addresses a problem that arises when due to contention for counter objects and other structures that are used to track the performance of the application logic 231 in the monitored host 230. In particular, the application logic 231 may write to a counter object while the monitoring runtime 232 concurrently reads the counter object in order to provide samples to the monitoring agent 210. This concurrent access to a counter object results in contention which can interfere with accurate performance monitoring and/or lead to clock drift.

The embodiment illustrated in FIG. 2C addresses this issue through the use of two distinct data slots 270a and 270b (also referred to as slots 0 and 1). In this example, sampling is performed over a specified fixed time interval (e.g., 5 seconds). In ongoing operation, during the Nth time interval, instrumentation logic 271 within the application logic 231 writes sample data to slot 0, while reporting logic 272 of the monitoring runtime 232 reads sample data from slot 1 (which was written during the N−1th time interval), as indicated by the solid arrows within the monitoring runtime 232. The reporting logic 272 then provides the sample data to the monitoring agent 210. During the N+1th time interval, a switchover is performed, such that the instrumentation logic 271 of the application logic 231 writes sample data to slot 1, while the reporting logic 272 of the monitoring runtime 232 reads sample data from slot 0 (written during the Nth time interval), as indicated by the dashed arrows within the monitoring runtime 232. This switchover is performed at each time interval transition. Because the reporting logic 272 always reads from a different slot than is being written to by the instrumentation logic 271, there is no contention for the data structures used to collect performance-related data.

The structure of the described performance monitor 200 may be modified in various ways. For example, the performance monitor 200 can be scaled, such as by adding additional computing systems to the monitoring capture cluster 240 and/or the monitoring store cluster 250. Also, other embodiments may decompose the functions of performance monitor 200 differently. For example, some embodiments may not assign the functions of capture and storage to different clusters, and instead merge those functions into a single physical or logical compute cluster.

Partition Selection and Tiered Data Storage

FIG. 3A illustrates the process of random distribution of performance-related data items across multiple data stores performed by some embodiments. More particularly, FIG. 3A depicts the ingestion service 246 storing data items across three distinct partitions 251a-251c. In FIG. 3A, time flows from the top to bottom, and data storage operations are illustrated with dashed lines.

In the illustrated example, the ingestion service 246 stores four data items per time interval. Four time intervals are shown. In this example, in the first and third time intervals, data items are stored to partition 251a; in the second time interval, data items are stored to partition 251b; and in the third time interval, data items are stored to partition 251c.

For each time interval, the partition used to store data items is determined by using an assignment function that considers information such as counter identifier, time interval, number of partitions, and the like, as discussed further below. The assignment function randomly distributes data items amongst the multiple partitions. Other embodiments may use other assignment functions, including round-robin, least-recently used, or the like.

Figure 3B:
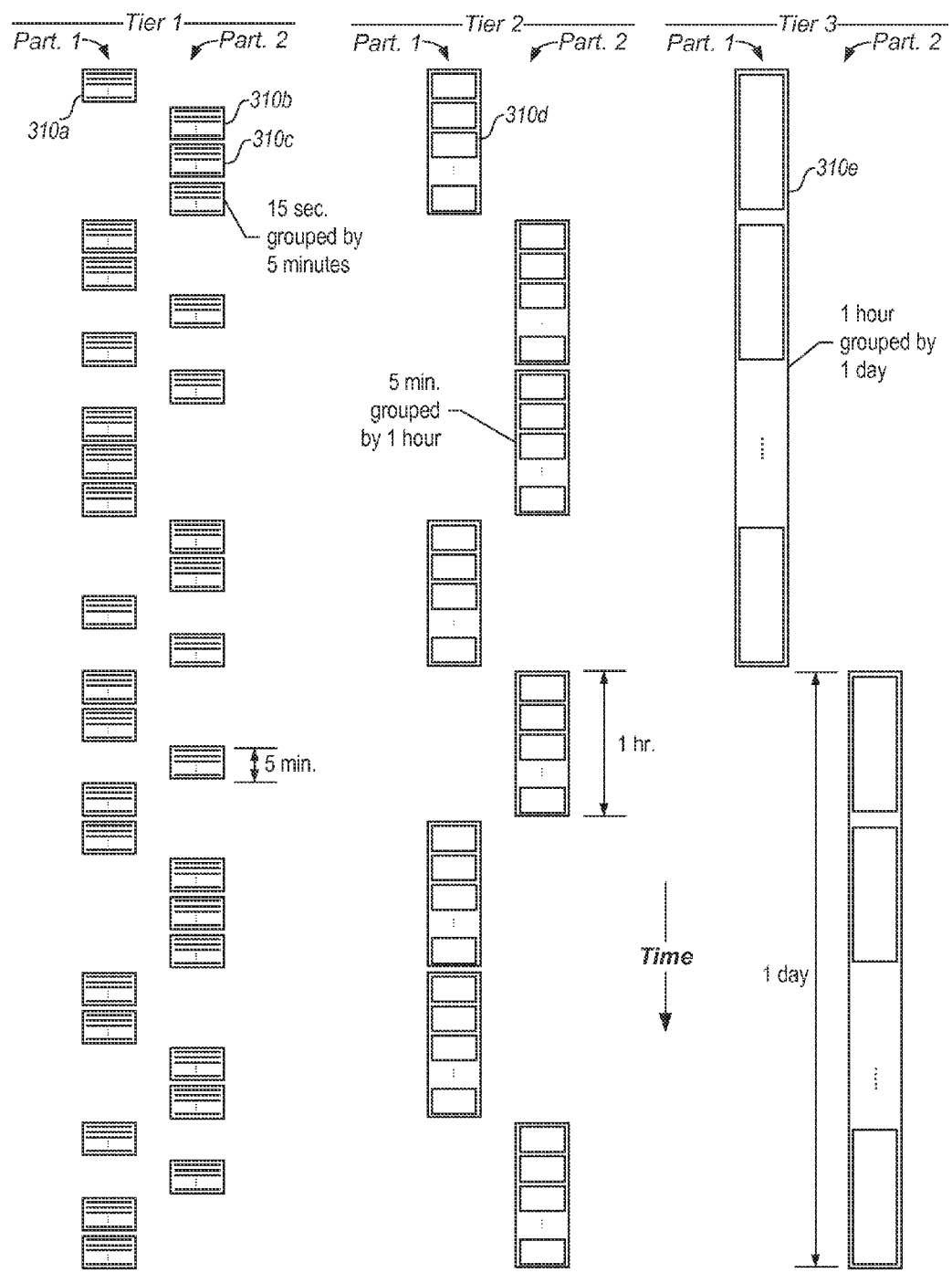
FIG. 3B illustrates tiered storage of performance-related data as performed by some embodiments.

FIG. 3B illustrates the process of tiered storage of performance-related data. Some embodiments store performance-related data in tiers, where the lowest tier represents data provided directly by the monitored computing systems, and where upper tiers include data that aggregates the performance-related data from lower tiers. Within each tier, data items are randomly assigned to data partitions as discussed herein.

FIG. 3B illustrates an example of tiered storage that uses three tiers that each have two partitions. The data in each tier is stored in one of partitions 1 and 2. Each tier has a corresponding time interval size. The time interval size of each tier N (N>1) encompasses multiple time intervals of the immediate lower tier N−1. In the example of FIG. 3B, tiers 1-3 respectively have time intervals of five minutes, one hour, and one day. During each interval, multiple time data items are stored. The number of data items stored is determined based on a sample length/period in relation to the time interval of a given tier. In the example of FIG. 3B, tiers 1-3 respectively have sample lengths of 15 seconds, five minutes, and one hour. Thus, during a given time interval, tier 1 stores 20 data items (five minute interval divided by a 15 second sample length); tier 2 stores 12 data items (one hour interval divided by 5 minute sample length); and tier 3 stores 24 data items (one day interval divided by one hour sample length).

Tier 1 is used to store data items obtained from monitored computing systems. The data items thus represent the "lowest level" data, including actual counter values reflecting the number of operations or other performance-related aspects of the monitored computing system. In FIG. 3B, time flows from top to bottom. That is, data items in a given tier corresponding to earlier time intervals are shown as being stored above data items corresponding to later time intervals. Thus, in tier 1, in the first time interval, 20 data items are stored in Partition 1, at location 310a. Data items stored at location 310a are represented as horizontal line segments contained within the rectangle representing location 310a. In the second time interval, 20 data items are stored in Partition 2, at location 310b. In the third time interval, 20 data items are stored in Partition 2, at location 310c. As noted, the partitions are assigned at random for each time interval. In this example, the first six time intervals in tier 1 respectively use Partitions 1, 2, 2, 2, 1, and 1.

Tier 2 aggregates data from tier 1. In this example, each of the data items (represented as a series of rectangles) stored at location 310d aggregate multiple data items from a single time interval in tier 1. In particular, the first (top) data item in location 310d is an aggregation of the twenty data items stored at location 310a; the second data item in location 310d is an aggregation of the twenty data items stored at location 310b; the third data item in location 310d is an aggregation of the twenty data items stored at location 310c; and so on. A total of 12 data items are stored in location 310d, each one representing 5 minutes worth of data by aggregating the 20 data items of a corresponding time interval storage location in tier 1.

As with tier 1, the storage partitions used by tier 2 are selected at random based on the time interval (and possibly other factors). Thus, in this example, the first six time intervals in tier 2 respectively use Partitions 1, 2, 2, 1, 2, and 1.

Tier 3 aggregates data from tier 2. In this example, each of the data items stored at location 310e aggregate multiple data items from a single time interval in tier 2. For example, the first (top) data item in location 310e is an aggregation of the 12 data items stored at location 310d in tier 2. A total of 24 data items are stored in location 310e, each one representing an hour's worth of data by aggregating the 12 data items of a corresponding time interval storage location in tier 2. Again, as discussed with tiers 1 and 2 above, the storage partitions used by tier 3 are selected at random.

The assignment of data items to partitions is performed at random in the illustrated example. In some embodiments, a pseudo-random number generator or other source of apparent or true randomness may be utilized to select a partition for a given time interval. One issue with some randomized approaches is that the identity of the partition used during a particular time interval needs to be stored so that it can later be recovered to look up the data items stored during that time interval. For example, assignments made via a pseudo-random number generator seeded with a clock value cannot easily be recovered unless the assignments are recorded or otherwise indexed so that they can be looked up at a later time. Unfortunately, recording the partition identifier for each counter on each monitored host for each time interval can require considerable additional data storage. Worse, this additional data represents a centralized point of contention and failure.

Some embodiments address the above issues by utilizing a function that randomly (or pseudo-randomly) assigns data items to partitions based on information about the data items, including one or more factors such as counter identifier, host identifier, time (e.g., timestamp, time interval), time interval size, tier identifier, number of data stores, or the like. One such approach is discussed with respect to TABLE 1, below.

TABLE 1, below, describes the structure of one example implementation of the described techniques.

TABLE 1

| Sample Tier ID | Sample Length | Partitioning Period |
|---|---|---|
| 1 | 15 seconds | 5 minutes |
| 2 | 5 minutes | 1 hour |
| 3 | 1 hour | 1 day |
| 4 | 1 day | 1 month |

TABLE 1 illustrates an example that uses four storage tiers 1-4. Each tier has an associated sample length and partitioning period (sometimes also referred to as "time interval size" herein), shown in the second and third columns, respectively. Sample length (sometimes also referred to as "sample period") is the time interval associated with each data item of the tier. Thus, in tier 1, data items are stored every 15 seconds. Each data item may represent an instantaneous sample (e.g., the number of operations performed by the monitored system, the current throughput of the monitored system) or an aggregation (e.g., sum, average, count, standard deviation) of multiple data items.

The partitioning period shown in the third column of TABLE 1 represents the time interval during which data items are stored in a first randomly (or otherwise) selected partition. Thus, in tier 1, data items are stored in one partition for a five minute time interval before a new partition is selected. In tier 1, given a sample length of 15 seconds, this means that twenty data items are stored in each partitioning period. A new (but not necessarily different) partition is selected every five minutes.

Tier 2 aggregates data from tier 1. Note that the sample length of tier 2 (five minutes) equals the partitioning period of tier 1. This equivalence is beneficial because, for each aggregation operation performed by tier 2, the necessary data items from tier 1 are located in a single partition. This means that about every five minutes, tier 2 stores a data item that aggregates the data items (twenty in this example) stored by tier 1 during the previous five minutes at a particular location in a single partition, as shown in FIG. 3B, above. In tier 2, the partitioning period is one hour. Given that tier 2 stores a data item every 5 minutes (as defined by the sample length), twelve data items are stored by tier 2 during every partitioning period time interval. In tier 2, partitions are selected every hour.

Tier 3 similarly aggregates the data of tier 2, using a sample length of one hour and a partitioning period of one day. Tier 4 similarly aggregates the data of tier 3, using a sample length of one day and a portioning period of one month.

The query service 256 of FIG. 2B supports ad-hoc queries for time periods spanning multiple partition periods. It does so by generating multiple queries that are distributed against the multiple partitions, and then merging the results.

In the implementation described with respect to TABLE 1, a hash function can be used to assign data items to partitions, as described in the equation below:

$$PID = HASH(CounterID + TierID + (T-T \% TierPartitioningPeriod)) \% N+1$$

In the above, PID is the partition ID, a number from 1 to N. N is the number of partitions used by the performance monitor. CounterID is a unique identifier for each counter in the monitored computing systems. TierID is a tier identifier, a number from 1 to 4 in the example of TABLE 1. T is a timestamp of the time at which a data item is obtained, provided, or stored. TierPartitioningPeriod is the time interval (expressed in the third column of TABLE 1) used for partition assignment.

The hashing approach used above causes data items to be randomly distributed across the multiple data stores. Random distribution eliminates hotspots and centralized points of failure. Distributing data items also yields robustness in the face of data storage failure. In particular, if one of the data stores of the performance monitor fails, at most 1/N samples (on average) will be lost for each tier. And given the use of multiple tiers, even if fine grained data from particular time interval is lost in tier 1, there is a high probability that an aggregated view of data from this time interval will still be present in one of the higher level tiers.

Furthermore, the described partition assignment approach addresses the issue of tracking partition assignments over time, so that they can be recovered for queries issued at later times. In particular, when using the above approach, the partition ID can be uniquely determined given only the time, counter ID, tier ID, partitioning period, and number of data stores. The partitioning period and number of data stores can be determined from a small and relatively static data structure/record that represents information such as that shown in TABLE 1, above. Using this approach, there is no need to access an index or other map that associates counter IDs and time with partitions.

The described techniques for storage of performance-related data items can be scaled with minimum complexity. In particular, additional data stores (in the form of additional storage, database servers, and/or data tables) can be added to increase the storage capacity and robustness of the performance monitoring system. When the system is expanded, the effective date of the transition is stored in association with relevant information about the expansion (e.g., that the number of partitions was increased from N=3 to N=5). The assignment function shown above will function correctly so long as the correct number of partitions (for the associated timestamp) is input, which can be readily referenced based on the effective date of the transition.

The above approach to partition selection and tiered data storage may be modified in various ways in other embodiments. For example, a greater or lesser number of storage tiers may be used, including only a single storage tier. Also, different time intervals for sampling and partitioning may be used. Furthermore, some embodiments may assign partitions in a different way, including round-robin, least-recently used, pseudo-random number generators (e.g., linear congruential, Mersenne Twister), or the like.

Example Processes

FIGS. 4A-4G are flow diagrams of processes performed by example embodiments.

Figure 4A:
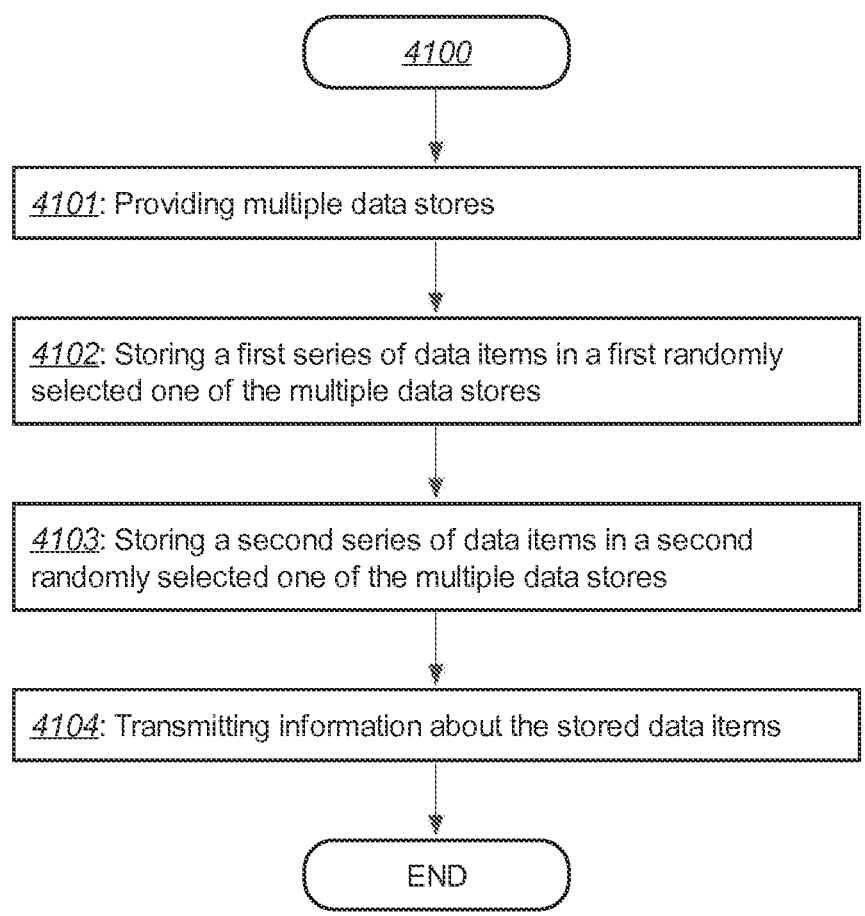

FIG. 4A is a flow diagram of example logic in a performance monitoring computing system. The illustrated logic in this and the following flow diagrams may be performed by, for example, one or more modules of the performance monitor 200 described with respect to FIG. 2B, above. More particularly, FIG. 4A illustrates a process 4100 that includes the following block(s).

Block 4101 includes providing multiple data stores that are each configured to store a series of data items that reflect performance of a monitored computing system. Each data store may be a distinct data storage device (e.g., a disk), a distinct database table, a distinct database server, or the like.

Block 4102 includes storing a first series of data items in a first randomly selected one of the multiple data stores, wherein the stored data items reflect performance of the monitored computing system during a first time interval. The data store may be selected by various processes, but in this embodiment are selected in a manner that serves to randomly distribute the data items stored with respect to a particular time interval. Thus, if the i-th data store is selected, all data items in the first series will be stored in the i-th data store. The data items may reflect actual counter values received from a monitored computing system, where the counter values represent a number of operations performed, operation throughput, operation latency, or the like. In addition, or in the alternative, the data items may be an aggregation of data items, such as those that are obtained from a lower-level tier in a tiered storage embodiment.

Block 4103 includes storing a second series of data items in a second randomly selected one of the multiple data stores, wherein the stored data items reflect performance of the monitored computing system during a second time interval, wherein the first time interval precedes the second time interval. The first and second time intervals are typically equal in size, for example five minutes in length. As noted different time interval sizes are contemplated. A tiered storage embodiment uses a different size for each of multiple tiers, such as 15 seconds, five minutes, one hour, one day, and one month.

Block 4104 includes transmitting information about the stored data items. Transmitting information may include transmitting values represented by the stored data items or aggregations thereof. For example, when the data items represent counter values, those counter values themselves may be transmitted for processing and/or display. Alternatively, the transmitted information may be based on an aggregation (e.g., summed, averaged) of the underlying data items.

FIG. 4B is a flow diagram of example logic illustrating an extension of process 4100 of FIG. 4A. More particularly, FIG. 4B illustrates a process 4200 that includes the process 4100, and which further includes the following block(s).

Block 4201 includes aggregating the stored first and second series of data items. Aggregating data items may include determining any statistical summary about the data items of the first and second tiers. For example, aggregating may include calculating a sum of the data items of the first series and a sum of the data items in the second series. Other functions are contemplated, including mean, maximum, minimum, count, standard deviation, or the like.

Block 4202 includes storing the aggregated data in a third randomly selected one of the multiple data stores, wherein the stored aggregated data reflects performance of the monitored computing system during a third time interval that encompasses the first and second time intervals. The third time interval is larger than the size of the first and second time interval. For example, if the first time interval is five minutes in length, the third time interval may be one hour in length.

FIG. 4C is a flow diagram of example logic illustrating an extension of process 4100 of FIG. 4A. More particularly, FIG. 4C illustrates a process 4300 that includes the process 4100, and which further includes the following block(s).

Block 4301 includes monitoring performance with respect to multiple distinct measurement tiers that each store data with respect to a corresponding sequence of time intervals of uniform size, wherein multiple time intervals of each tier are encompassed by a single time interval of an immediate higher tier. As discussed, any number of tiers may be used, although a typical embodiment uses a total of four distinct tiers having respective time intervals of 15 seconds, five minutes, one hour, and one day. Other numbers of tiers and other combinations of time intervals are contemplated.

Block 4302 includes monitoring performance at a first measurement tier that stores data items that reflect performance of the monitored computing system during a sample period of N seconds. As also discussed above, each tier may have a corresponding sample length/period. The sample period is the period of time over which each stored data item reflects the performance of the monitored system. For example, a sample period of 15 seconds (N=15) means that each data item reflects performance of the monitored system over a 15 second time period.

Block 4303 includes monitoring performance with respect to a second measurement tier that stores data items that reflect performance of the monitored computing system during a sample period of M seconds, wherein each data item of the second measurement tier aggregates M/N data items obtained from the first measurement tier. In the second tier, the sample period may be 5 minutes, or 300 seconds (M=300). Given these parameters, each time interval of the second tier would store 20 (300/15) data items.

Figure 4D:
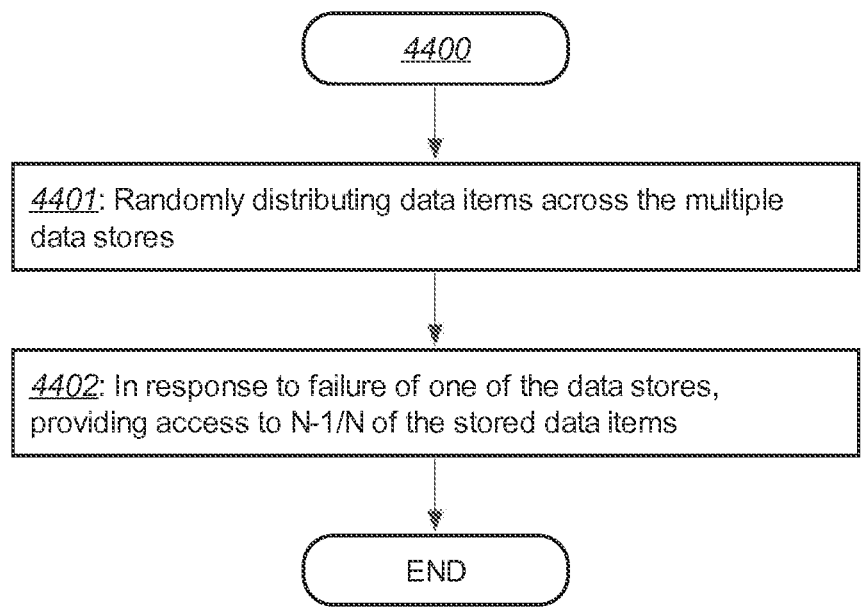

FIG. 4D is a flow diagram of example logic illustrating an extension of process 4100 of FIG. 4A. More particularly, FIG. 4D illustrates a process 4400 that includes the process 4100, and which further includes the following block(s).

Block 4401 includes randomly distributing data items across the multiple data stores, such that on average 1/N of the data items are stored on each data store, wherein N equals the total number of data stores. By randomly selecting the data stores, the stored data items become randomly distributed across the multiple data stores. Therefore, on average, about 1/N of the data items are stored in each data store.

Block 4402 includes in response to failure of one of the data stores, providing access to N−1/N of the stored data items. Because data items are randomly distributed across the multiple data stores, if one data store fails, an average of 1/N of the data will be lost, while N−1/N of the data will remain accessible.

Figure 4E:
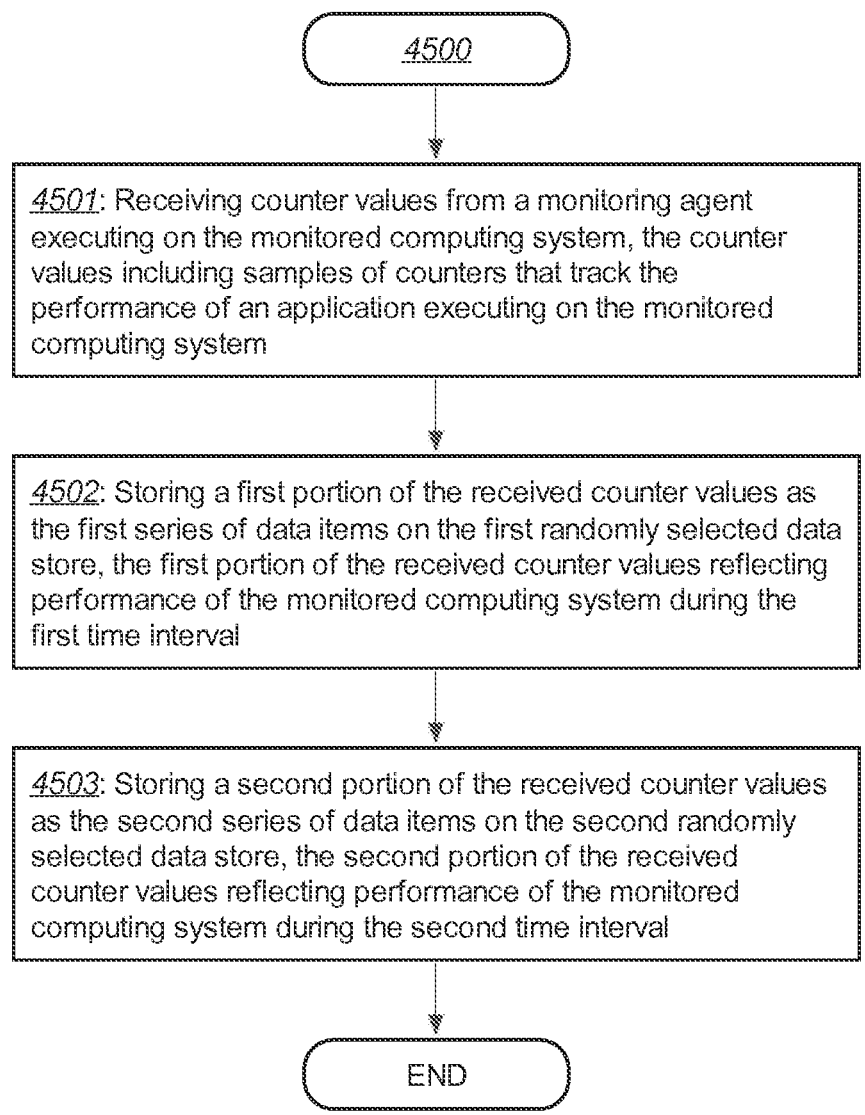

FIG. 4E is a flow diagram of example logic illustrating an extension of process 4100 of FIG. 4A. More particularly, FIG. 4E illustrates a process 4500 that includes the process 4100, and which further includes the following block(s).

Block 4501 includes receiving counter values from a monitoring agent executing on the monitored computing system, the counter values including samples of counters that track the performance of an application executing on the monitored computing system. The counter values may be obtained by the monitoring agent by accessing counter objects or other data structures on the monitored computing system. As noted, the monitored code on the monitored computing system may be instrumented or sampled in order to update the counter objects.

Block 4502 includes storing a first portion of the received counter values as the first series of data items on the first randomly selected data store, the first portion of the received counter values reflecting performance of the monitored computing system during the first time interval. The counter values may be received in association with a timestamp. The first portion of the received counter values include those counter values having a timestamp that is within the first time interval. The timestamp may be associated at different times or in various places. For example, the timestamp may be associated by the monitoring agent when the monitoring agent samples or receives the counter value from the monitored code. In other embodiments, the timestamp may be associated with the counter value when it is updated by the monitored code.

Block 4503 includes storing a second portion of the received counter values as the second series of data items on the second randomly selected data store, the second portion of the received counter values reflecting performance of the monitored computing system during the second time interval. The second portion of the received counter values include those counter values having a timestamp that is within the second time interval.

Figure 4F:
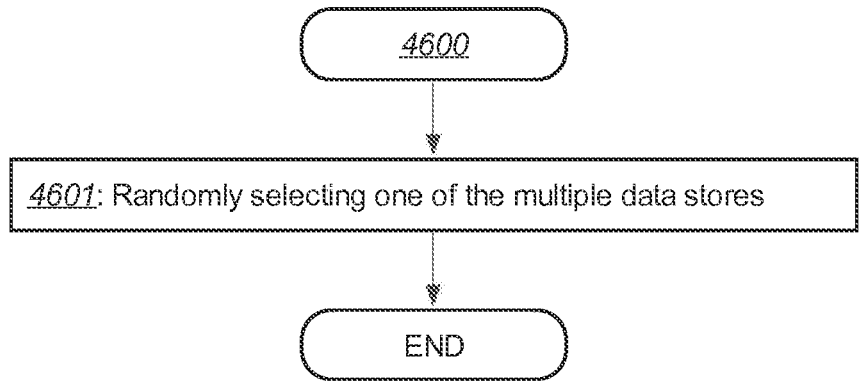

FIG. 4F is a flow diagram of example logic illustrating an extension of process 4100 of FIG. 4A. More particularly, FIG. 4F illustrates a process 4600 that includes the process 4100, and which further includes the following block(s).

Block 4601 includes randomly selecting one of the multiple data stores for storage of the first series of data items, based on a hash function applied to an arithmetic combination at least some of: a counter identifier associated with the first series of data items, a tier identifier, a timestamp, and a tier partitioning period. In some embodiments, all factors will be used, as when using an assignment formula such as PID=hash (CounterID+TierID+(T−T % TierPartitioningPeriod)) % N+1, described further above. Other variations and/or arithmetic combinations are contemplated. As also discussed, some embodiments do not use hashing as part of the assignment process. Instead, a pseudo-random number generator may be employed.

Figure 4G:
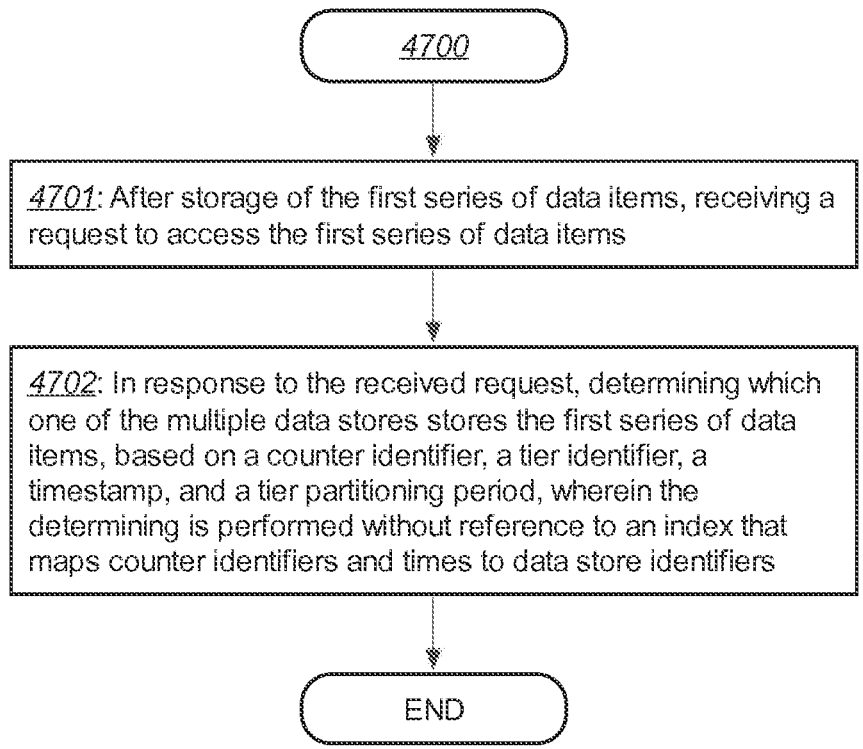

FIG. 4G is a flow diagram of example logic illustrating an extension of process 4100 of FIG. 4A. More particularly, FIG. 4G illustrates a process 4700 that includes the process 4100, and which further includes the following block(s).

Block 4701 includes after storage of the first series of data items, receiving a request to access the first series of data items. After the data items are stored, they may be accessed for various purposes, including aggregation, reporting, analysis, or the like.

Block 4702 includes in response to the received request, determining which one of the multiple data stores the first series of data items, based on a counter identifier, a tier identifier, a timestamp, and a tier partitioning period, wherein the determining is performed without reference to an index that maps counter identifiers and times to data store identifiers. The identity of the data store that stores the data items of the first series may be determined solely by reference to factors such as time, counter identifier, and tier identifier. Significantly, in some embodiments this determination is made without consulting an index or other data structure that maps counter identifiers to storage locations. In particular, this determination can be made by evaluating the assignment function (or similar) described above, thereby obviating the need for external mapping indexes.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Example Computing System Implementation

Figure 5:
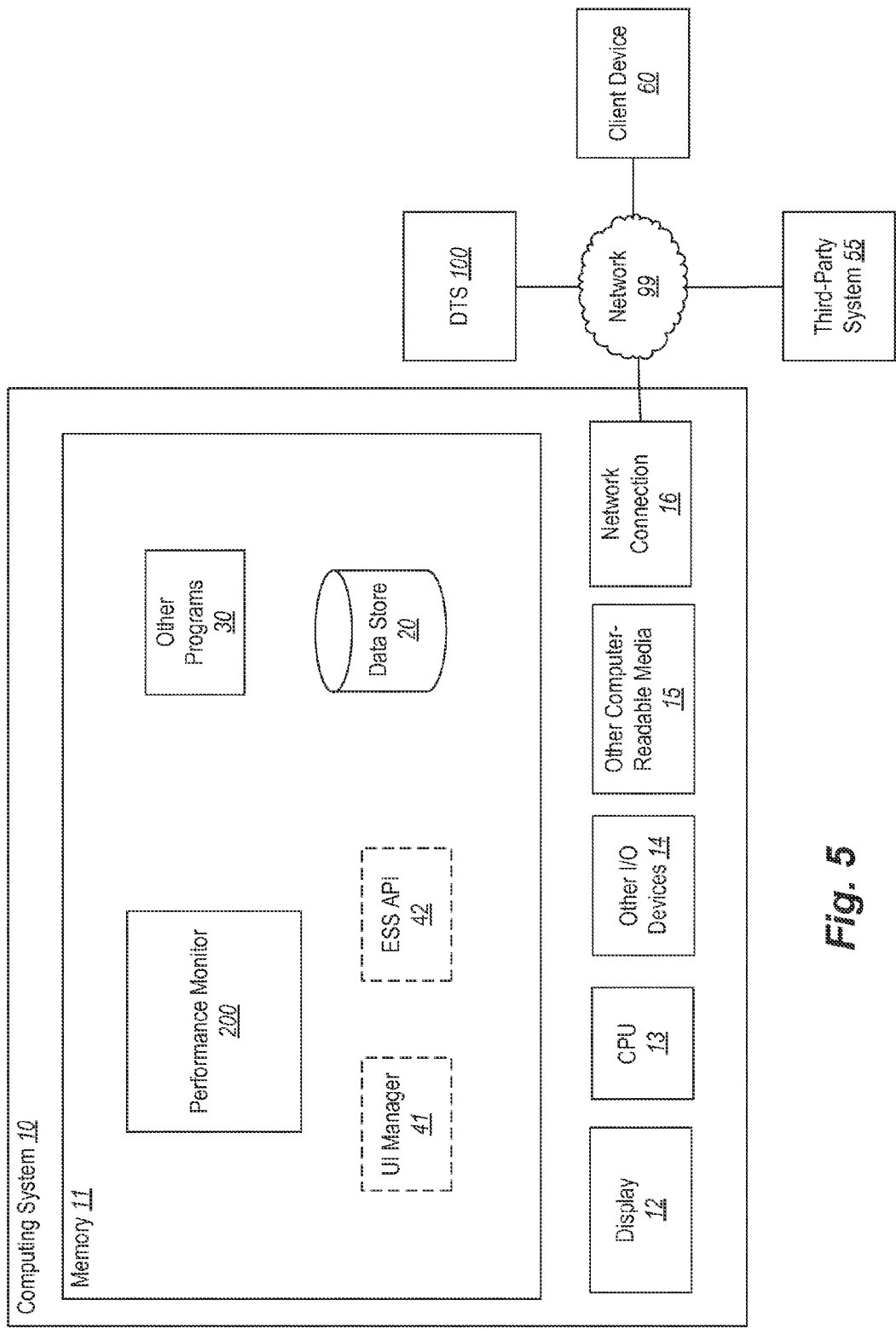
FIG. 5 is a block diagram of an example computing system for implementing example embodiments.

FIG. 5 is a block diagram of an example computing system for implementing example embodiments. In particular, FIG. 5 shows a computing system 10 that may be utilized to implement a performance monitor 200 or some subsystem thereof.

Note that one or more general-purpose or special-purpose computing systems/devices may be used to implement the described techniques. In addition, the computing system 10 may comprise one or more distinct computing systems/devices and may span distributed locations. Furthermore, each block shown may represent one or more such blocks as appropriate to a specific embodiment or may be combined with other blocks. Also, the described techniques may be implemented in software, hardware, firmware, or in some combination to achieve the capabilities described herein.

In the embodiment shown, computing system 10 comprises a computer memory 11, a display 12, one or more Central Processing Units ("CPU") 13, input/output devices 14 (e.g., keyboard, mouse, LCD display, touch screen, and the like), other computer-readable media 15, and a network connection 16 connected to a network 99. The performance monitor 200 is shown residing in memory 11. The components of the performance monitor 200 preferably execute on one or more CPUs 13 and perform the processes described herein. Other code or programs 30 (e.g., an administrative interface, a Web server, and the like) and a data store 20, also reside in the memory 11, and preferably execute on one or more CPUs 13. Of note, one or more of the components in FIG. 5 may not be present in any specific implementation. For example, some embodiments may not provide other computer-readable media 15 or a display 12.

The illustrated performance monitor 200 may also interact with a user interface ("UI") manager 41 and an application program interface ("API") 42. The UI manager 41 and API 42 are shown in dashed lines to indicate that in other embodiments they may be provided by other, possibly remote, computing systems. The UI manager 41 provides a view and a controller that facilitate user interaction with the performance monitor 200 and its various components. For example, the UI manager 41 may provide access to the dashboard service 260, the report service 262, and/or the health monitoring service 264. In some embodiments, access to the functionality of the UI manager 41 may be provided via a Web server, possibly executing as one of the other programs 30. In such embodiments, a user operating a Web browser (or other client) executing on the client device 60 can interact with the performance monitor 200 via the UI manager 41.

The API 42 provides programmatic access to one or more functions of the performance monitor 200. For example, the API 42 may provide a programmatic interface to one or more functions of the performance monitor 200 that may be invoked by one of the other programs 30 or some other module. In this manner, the API 42 facilitates the development of third-party software, such as user interfaces, plug-ins, news feeds, adapters (e.g., for integrating functions of the performance monitor 200 into Web applications), and the like. In addition, the API 42 may be in at least some embodiments invoked or otherwise accessed via remote entities, such as the third-party system 55, to access various functions of the performance monitor 200. For example, code executing in the DTS 100 may use the API 42 to provide performance-related data to the performance monitor 200. As another example, a third-party dashboard application executing on the third-party system 55 or the client device 60 may use the API 42 to query the performance-related data stored by the performance monitor 200.

The data store 20 is used by the other modules of the performance monitor 200 to store and/or communicate information. The components of the performance monitor 200 use the data store 20 to record various types of information, including performance-related data obtained from monitored computing systems, aggregated performance-related data generated by the performance monitor 200, meta-information (e.g., describing the identity, number, and structure of the storage partitions), and the like. Although the components of the performance monitor 200 are described as communicating at least in part through the data store 20, other communication mechanisms are contemplated, including message passing, function calls, pipes, sockets, shared memory, and the like.

The performance monitor 200 interacts via the network 99 with the DTS 100, client device 60, and third-party systems 55. The network 99 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 99 may be or include multiple distinct communication channels or mechanisms (e.g., cable-based and wireless). The client device 60 includes personal computers, laptop computers, smart phones, personal digital assistants, tablet computers, kiosk systems, and the like. The client device 60 may be one of the sender or recipient client devices 50 or 51 described with respect to FIG. 1. Also, the DTS 100, third-party systems 55 and client device 60 may be or include computing systems and/or devices constituted in a manner similar to that of computing system 10, and thus may also include displays, CPUs, memory, code logic, other I/O devices (e.g., a camera), network connections, or the like.

In an example embodiment, components/modules of the performance monitor 200 are implemented using standard programming techniques. For example, the performance monitor 200 may be implemented as a "native" executable running on the CPU 13, along with one or more static or dynamic libraries. In other embodiments, the performance monitor 200 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The data store 20 may be implemented as one or more database systems, file systems, or any other technique for storing such information, or any combination of the above, including implementations using distributed computing techniques. In addition, some embodiments may provide one or more interfaces to the data stored as part of the performance monitor 200. Such interfaces may be provided via database connectivity APIs accessed from a variety of programming languages, Web-based interfaces, file systems interfaces, or the like.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in certain embodiments, some or all of the components of the performance monitor 200 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored in a non-transitory manner on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A system for monitoring performance, the system comprising:
   multiple data stores that are each configured to store a series of data items that reflect performance of a monitored computing system; and
   a monitoring computing system that includes a processor and a memory that includes instructions that are configured, when executed by the processor, to monitor performance of the monitored computing system, by:
      storing a first series of data items in a first randomly selected one of the multiple data stores, wherein the stored data items reflect performance of the monitored computing system during a first time interval;
      storing a second series of data items in a second randomly selected one of the multiple data stores, wherein the stored data items reflect performance of the monitored computing system during a second time interval, wherein the first time interval precedes the second time interval; and
      transmitting information about the stored data items; and
   a monitoring agent that executes on the monitored computing system and that is configured to:
      obtain counter values from a monitored application executing on the monitored computing system, wherein the counter values are provided by counter objects that are modified by instrumentation code in the monitored application and that represent one or more of: a number of operations performed by the monitored application, a response time of the monitored application, a processing time of the monitored application, or a throughput of the monitored application; and
      transmit the counter values as the first series of data items to the monitoring computing system for storage on the first randomly selected data store.

2. The system of claim 1, wherein the monitoring computing system is configured to:
   aggregate the stored first and second series of data items; and
   store the aggregated data in a third randomly selected one of the multiple data stores, wherein the stored aggregated data reflects performance of the monitored computing system during a third time interval that encompasses the first and second time intervals.

3. The system of claim 1, wherein the monitoring computing system is configured to: monitor performance with respect to multiple distinct measurement tiers including a top tier and a bottom tier that each store data with respect to a corresponding sequence of time intervals of uniform size, wherein multiple time intervals of each tier that is not the top tier are encompassed by a single time interval of an immediate higher tier, and wherein each tier that is not the bottom tier aggregates data items stored in its immediate lower tier.

4. The system of claim 3, wherein the monitoring computing system is further configured to:
   monitor performance at a first measurement tier that stores data items that reflect performance of the monitored computing system during a first sample period of N seconds; and
   monitor performance with respect to a second measurement tier that is above the first tier and that stores data items that reflect performance of the monitored computing system during a second sample period of M seconds, wherein each data item of the second measurement tier aggregates M/N data items obtained from the first measurement tier.

5. The system of claim 4, wherein the first sample period is less than one minute and second sample period is more than one minute and less than one hour.

6. The system of claim 1, wherein the monitoring computing system is configured to: for each of multiple successive time periods, randomly select one of the multiple data stores for storage of data items associated with that time period.

7. The system of claim 1, wherein the counter objects include:
   a first and a second data slot that are alternately used to store counter data during subsequent time intervals;
   wherein, during a first time interval, the instrumentation code updates the first data slot while data from the second data slot is provided to the monitoring agent; and
   wherein, during a second time interval immediately subsequent to the first time interval, the instrumentation code updates the second data slot while data from the first data slot is provided to the monitoring agent.

8. The system of claim 1, wherein the monitored computing system is a digital transaction service comprising multiple distinct computing systems configured to facilitate digital transactions including associating electronic signatures with documents.

9. A method in a performance monitoring computing system, the method comprising:
   providing multiple data stores that are each configured to store a series of data items that reflect performance of a monitored computing system;
   storing a first series of data items in a first randomly selected one of the multiple data stores, wherein the stored data items reflect performance of the monitored computing system during a first time interval;
   storing a second series of data items in a second randomly selected one of the multiple data stores, wherein the stored data items reflect performance of the monitored computing system during a second time interval, wherein the first time interval precedes the second time interval; and
   transmitting information about the stored data items;
   wherein the first randomly selected one of the multiple data stores and the second randomly selected one of the multiple data stores randomly distributes data items across the multiple data stores, such that on average 1/N of the data items are stored on each data store of the multiple data stores, wherein N equals the total number of data stores; and
   in response to failure of one of the data stores, providing access to N−1/N of the stored data items.

10. The method of claim 9, further comprising:
    aggregating the stored first and second series of data items; and
    storing the aggregated data in a third randomly selected one of the multiple data stores, wherein the stored aggregated data reflects performance of the monitored computing system during a third time interval that encompasses the first and second time intervals.

11. The method of claim 9, further comprising:
monitoring performance with respect to multiple distinct measurement tiers that each store data with respect to a corresponding sequence of time intervals of uniform size, wherein multiple time intervals of each tier are encompassed by a single time interval of an immediate higher tier;
monitoring performance at a first measurement tier that stores data items that reflect performance of the monitored computing system during a sample period of N seconds; and
monitoring performance with respect to a second measurement tier that stores data items that reflect performance of the monitored computing system during a sample period of M seconds, wherein each data item of the second measurement tier aggregates M/N data items obtained from the first measurement tier.

12. The method of claim 9, further comprising:
receiving counter values from a monitoring agent executing on the monitored computing system, the counter values including samples of counters that track the performance of an application executing on the monitored computing system;
storing a first portion of the received counter values as the first series of data items on the first randomly selected data store, the first portion of the received counter values reflecting performance of the monitored computing system during the first time interval; and
storing a second portion of the received counter values as the second series of data items on the second randomly selected data store, the second portion of the received counter values reflecting performance of the monitored computing system during the second time interval.

13. The method of claim 9, further comprising: randomly selecting one of the multiple data stores for storage of the first series of data items, based on a hash function applied to an arithmetic combination at least some of: a counter identifier associated with the first series of data items, a tier identifier, a timestamp, and a tier partitioning period.

14. The method of claim 13, wherein the randomly selecting one of the multiple data stores includes:
calculating a partition identifier by evaluating PID=hash (CounterID+TierID+(T−T % TierPartitioning Period)) % N+1, wherein PID is a partition identifier, CounterID is the counter identifier associated with the first series of data items, T is the timestamp, TierPartitionPeriod is the tier partitioning period.

15. The method of claim 9, further comprising:
after storage of the first series of data items, receiving a request to access the first series of data items; and
in response to the received request, determining which one of the multiple data stores the first series of data items, based on a counter identifier, a tier identifier, a timestamp, and a tier partitioning period, wherein the determining is performed without reference to an index that maps counter identifiers and times to data store identifiers.

16. The method of claim 9, further comprising: randomly selecting one of the multiple data stores for storage of the first series of data items based on output of a pseudo-random number generator.

17. A non-transitory computer-readable medium including contents that, when executed on a computing system, cause the computing system to perform operations comprising:
providing multiple data stores that are each configured to store a series of data items that reflect performance of a monitored computing system;
storing, during a first time interval, a first series of data items in a first randomly selected one of the multiple data stores, wherein the stored data items reflect performance of the monitored computing system during the first time interval;
storing, during a second time interval, a second series of data items in a second randomly selected one of the multiple data stores, wherein the stored data items reflect performance of the monitored computing system during the second time interval, wherein the first time interval precedes the second time interval; and
monitoring performance with respect to multiple distinct measurement tiers that each store data with respect to a corresponding sequence of time intervals of uniform size, wherein multiple time intervals of each tier are encompassed by a single time interval of an immediate higher tier transmitting information about the stored data items;
wherein the first randomly selected one of the multiple data stores is randomly selected based on a hash function applied to an arithmetic combination at least some of: a counter identifier associated with the first series of data items, a tier identifier, a timestamp, and a tier partitioning period.

18. The computer-readable medium of claim 17, wherein the contents include instructions that, when executed by the computing system, cause the computing system to for each of multiple successive time periods, randomly select one of the multiple data stores for storage of data items associated with that time period.

19. A method in a performance monitoring computing system, the method comprising:
providing multiple data stores that are each configured to store a series of data items that reflect performance of a monitored computing system;
storing a first series of data items in a first randomly selected one of the multiple data stores, wherein the stored data items reflect performance of the monitored computing system during a first time interval;
storing a second series of data items in a second randomly selected one of the multiple data stores, wherein the stored data items reflect performance of the monitored computing system during a second time interval, wherein the first time interval precedes the second time interval;
receiving counter values from a monitoring agent executing on the monitored computing system, the counter values including samples of counters that track the performance of an application executing on the monitored computing system;
storing a first portion of the received counter values as the first series of data items on the first randomly selected data store, the first portion of the received counter values reflecting performance of the monitored computing system during the first time interval;
storing a second portion of the received counter values as the second series of data items on the second randomly selected data store, the second portion of the received counter values reflecting performance of the monitored computing system during the second time interval; and
transmitting information about the stored data items.

* * * * *